(12) United States Patent
Wanni

(10) Patent No.: US 9,458,819 B2
(45) Date of Patent: Oct. 4, 2016

(54) WAVE ENERGY CONVERTER

(71) Applicant: Amar S. Wanni, Fairfax, VA (US)

(72) Inventor: Amar S. Wanni, Fairfax, VA (US)

(*) Notice: Subject to any disclaimer, the term of this patent is extended or adjusted under 35 U.S.C. 154(b) by 0 days.

(21) Appl. No.: 14/785,765

(22) PCT Filed: Jul. 27, 2015

(86) PCT No.: PCT/US2015/042176
§ 371 (c)(1),
(2) Date: Oct. 20, 2015

(87) PCT Pub. No.: WO2016/022315
PCT Pub. Date: Feb. 11, 2016

(65) Prior Publication Data
US 2016/0252070 A1 Sep. 1, 2016

Related U.S. Application Data

(60) Provisional application No. 62/034,241, filed on Aug. 7, 2014, provisional application No. 62/155,831, filed on May 1, 2015.

(51) Int. Cl.
*F03B 13/18* (2006.01)
*F03B 13/14* (2006.01)

(52) U.S. Cl.
CPC ........... *F03B 13/187* (2013.01); *F03B 13/148* (2013.01)

(58) Field of Classification Search
CPC ........ Y02E 10/38; F03B 13/12; F03B 13/14; F03B 13/148; F03B 13/16; F03B 13/18; F03B 13/1845; F03B 13/185; F03B 13/187; F03B 13/1875

USPC .............. 60/495–507; 290/42, 53; 417/100, 417/330–337
See application file for complete search history.

(56) References Cited

U.S. PATENT DOCUMENTS 4,495,765 A   1/1985   French
5,355,674 A   10/1994  Rosenberg
(Continued)

FOREIGN PATENT DOCUMENTS

JP   57200674 A   * 12/1982
JP   05223052 A   *  8/1993
(Continued)

OTHER PUBLICATIONS

ISA/US, Commissioner for Patents, International Search Report and Written Opinion for PCT/US15/42176, mailed Oct. 9, 2015, Alexandria, Virginia, USA.

*Primary Examiner* — Hoang Nguyen
*Assistant Examiner* — Mickey France
(74) *Attorney, Agent, or Firm* — Louis Ventre, Jr.

(57) ABSTRACT

A wave energy converter located on the seabed extracts the potential energy in a wave transiting over the wave energy converter. The converter includes a vessel arranged so that its longitudinal axis is located near seabed so that an upstream opening near one end sits below the crest of the wave when and a downstream opening near the other end sits below the trough of the wave. Repetitive waves flowing over the converter cause a cyclic difference in the weight of the water above the openings. This cyclic weight differential in turn creates a horizontal cyclic force acting on the piston, which in turn acts on a hydraulic cylinder to create a high-pressure hydraulic fluid. A vertical embodiment operating on similar principles is also disclosed.

14 Claims, 12 Drawing Sheets

(56) References Cited

U.S. PATENT DOCUMENTS

| | | | |
|---|---|---|---|
| 5,909,060 A * | 6/1999 | Gardner | E02B 9/08 290/42 |
| 5,955,790 A | 9/1999 | North | |
| 6,291,904 B1 | 9/2001 | Carroll | |
| 6,731,019 B2 | 5/2004 | Burns et al. | |
| 7,632,041 B2 * | 12/2009 | Jean | E02B 9/08 405/76 |
| 7,768,144 B2 | 8/2010 | North et al. | |
| 8,581,432 B2 * | 11/2013 | Rohrer | F03B 13/1815 290/42 |
| 8,604,631 B2 * | 12/2013 | Rohrer | F03B 13/1815 290/42 |
| 8,963,352 B2 * | 2/2015 | Healy | F03B 13/187 290/43 |
| 2003/0001392 A1 | 1/2003 | Gerber et al. | |
| 2005/0066654 A1 | 3/2005 | Koivusaari | |
| 2006/0090463 A1 * | 5/2006 | Burns | F03B 13/148 60/495 |
| 2008/0019847 A1 * | 1/2008 | Burns | F03B 13/148 417/330 |
| 2008/0050178 A1 | 2/2008 | Erlingsson | |
| 2008/0267712 A1 * | 10/2008 | Jean | E02B 9/08 405/76 |
| 2009/0007557 A1 * | 1/2009 | Farley | F03B 13/148 60/398 |
| 2010/0207390 A1 * | 8/2010 | Zimmermann | F03B 13/187 290/53 |
| 2010/0308589 A1 * | 12/2010 | Rohrer | F03B 13/188 290/53 |
| 2010/0308590 A1 * | 12/2010 | Rohrer | F03B 13/1815 290/53 |
| 2012/0126540 A1 * | 5/2012 | Healy | F03B 13/187 290/53 |
| 2014/0130497 A1 * | 5/2014 | Anteau | F03B 17/005 60/639 |
| 2015/0226175 A1 * | 8/2015 | Song | F03B 13/142 290/52 |

FOREIGN PATENT DOCUMENTS

| | | | | |
|---|---|---|---|---|
| NL | 1002765 C1 * | 7/1996 | | F03B 13/148 |
| NL | WO9737123 A1 | 10/1997 | | |

* cited by examiner

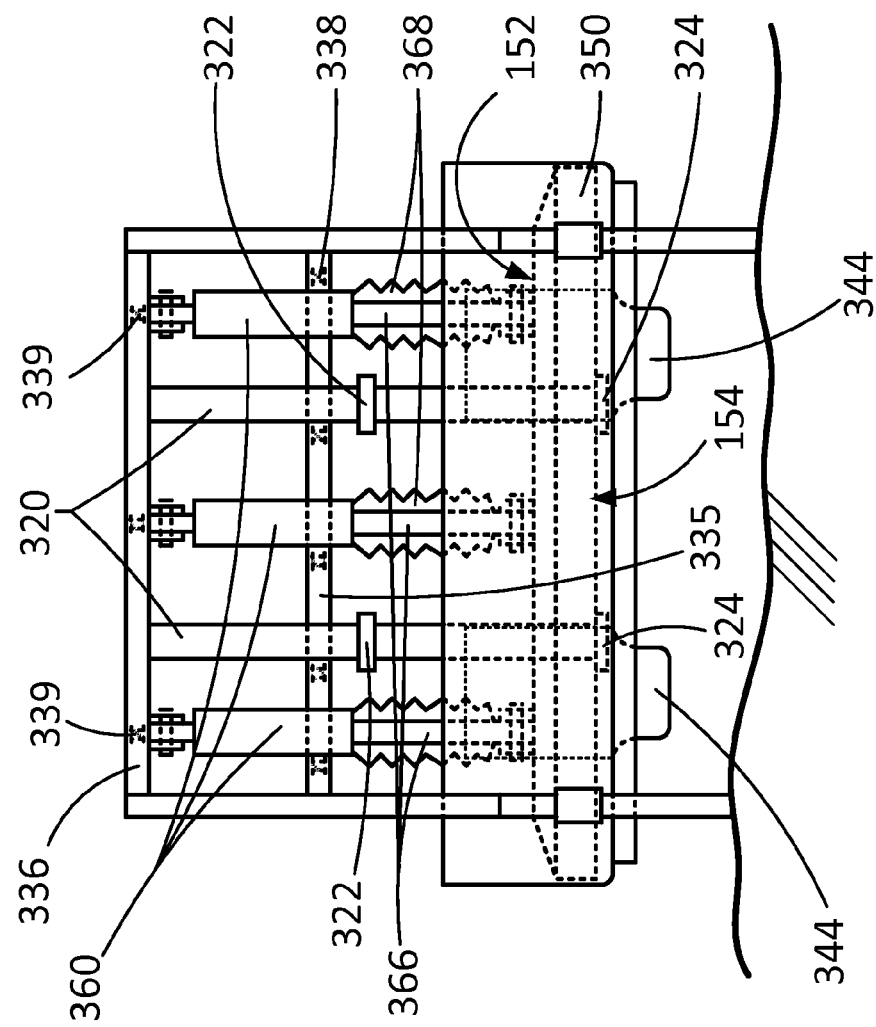

WAVE ENERGY CONVERTER

CROSS-REFERENCE TO RELATED APPLICATIONS

This application claims the benefit of U.S. Provisional Application No. 62/034,241, filed 7 Aug. 2014 and U.S. Provisional Application No. 62/155,831, filed 1 May 2015, which are both hereby incorporated by reference herein.

TECHNICAL FIELD

In the field of extracting energy from ocean waves, a seabed-mounted wave energy converter uses differential pressure acting on opposing faces of a piston to extract energy from a wave transiting on the surface of a body of water by pressurizing hydraulic fluid below the surface water level and below a location of transiting waves, where the pressurized hydraulic fluid may be utilized to produce electricity or for other purposes.

BACKGROUND ART

Devices to convert the kinetic and potential energy in ocean waves to a usable form have been disclosed and have been used to create useful energy. None, however, uses differential pressure acting simultaneously on opposing faces of a piston where these opposing faces are fluid-mechanically connected to two distinct locations along the wave direction. In the best case, one face is connected to the higher pressure resulting from the crest of the wave while the other face is connected to the lower pressure resulting from the trough of the wave—this unbalanced system creates a differential (net) pressure force on the piston.

In addition, no such prior art has resulted in widely accepted practical application partly because of cost, partly because of the complicated machinery required, and partly because of risk of loss from unpredictable natural causes.

Ocean or sea waves are naturally formed primarily by prevailing winds, temperature, rain and gravitational forces of the moon. The ubiquitous nature of ocean waves makes them available for harvesting by any person or nation with access to a shoreline. The inexorable and near relentless wave action in almost all bodies of water offers a diffuse but significant source of natural, renewable energy. This energy will be harvested for practical purposes once a simple, robust and cost effective energy extraction device is available.

Extracting wave energy in a cost effective system with simplified machinery and low risk of loss from hurricanes or other natural weather phenomena remains a formidable challenge.

Seabed-located systems for extracting wave energy have been proposed and thus the basic principles are known. However, there is inventive room for improvement in structural simplicity, cost minimization and robustness in a hostile environment.

SUMMARY OF INVENTION

A wave energy converter uses differential pressure acting on opposing faces of a piston located near the seabed to extract the potential energy between the crest and trough of the surface wave transiting over the converter. The converter includes a vessel arranged so that its longitudinal axis is located near seabed with one opening located under the crest of the wave and another opening located under the trough of the wave.

An upstream opening near one end of the vessel sits below the crest of the wave when and a downstream opening near the other end of the vessel sits below the trough of the wave. As the wave moves, the trough of the wave moves over the upstream opening while the crest moves over the downstream opening. The difference in the weight of the water above the openings creates a cyclic force acting on the piston in one direction and then in the reverse direction.

A first piston is slidably secured within the first vessel between the upstream opening and the downstream opening, which is moved by the cyclic forces. The first piston slides mostly horizontally within the first vessel in reaction to the force of the water pressure differential.

An upstream hydraulic cylinder within the first vessel is aligned parallel to the longitudinal axis and is mounted to the first vessel and to the first piston. When the trough of the wave is over the upstream opening and the crest of the wave is over the downstream opening, the piston moves toward the upstream hydraulic cylinder thereby providing pressurized fluid into a high-pressure manifold. When the crest of the next wave passes over the upstream opening and the trough of the wave is over the downstream opening, the piston is moved away from the upstream hydraulic cylinder.

There may be two hydraulic cylinders, one at each end of the first vessel, in order to decrease the overall load taken by any hydraulic cylinder and to balance forces acting on the first vessel and on the first piston.

A slidable cover plate over each downstream opening may be used to fine tune the distance between the upstream opening and the downstream opening. A hydraulic actuator may be used to move the slidable cover plate. A position sensor for each cover plate enables remote adjustment of the position of the cover plate.

An alternative embodiment uses a vessel oriented vertically. A part of the vessel represented by a vertical upstream duct lies under the crest of the wave and is connected at the bottom to a horizontal duct that opens up into a vertical downstream duct at a distance away where the wave trough at the free surface of the sea is found. A screen attached to the vertical downstream duct keeps out fish and debris. With a vertical orientation, the vessel contains a vertically sliding second piston. A second hydraulic cylinder is attached at one end to the structural framing holding the vessel and at the other end to the second piston. Wave action cyclically moves the piston up and down and causes the hydraulic cylinder to pressurize a hydraulic fluid.

To eliminate entrained sand and other debris, there may be a swivel door that opens at a low point in the horizontal duct. Adjustable legs may be added to enable the structure to be adjusted for variable seabed terrain.

Technical Problem

A device is needed to extract the potential energy in an ocean wave where that device has structural simplicity, offers cost minimization and is physically robust in a hostile environment.

Converting the potential energy in a sea or ocean wave within the ocean environment into useful energy requires overcoming hostile conditions, such as saltwater corrosively, biota infiltration and occasional weather challenges routinely found in that environment.

Examples include, a hurricane or similar natural weather conditions present forces that can wreak havoc with surface infrastructure and increase costs of repair and maintenance; saltwater conditions are chemically aggressive and contain marine life that result in biofouling of the operating system, further adding to a dynamic state of unpredictable consequences from hostile environmental conditions.

Solution to Problem

The solution is the wave energy converter that produces high pressure hydraulic fluid for a multiplicity of potential uses, including uses such as electricity production, powering mechanical equipment, powering a kinetic energy storage device, or desalination of seawater. The solution is a structural device for power generation that operates in response to periodic surface wave transit over relatively fixed positions on the seabed. The solution is a system that is functional independently of surface weather and water conditions.

Advantageous Effects of Invention

The advantages of the wave energy converter include:
(a) Essentially unaffected sea surface for fishing vessels and ships.
(b) Mostly unaffected sea for migration of sea animals, including whales.
(c) Ability to generate electrical power onshore so that eddy-current issues would not affect marine organisms that would otherwise occur with undersea cables for power transmission.
(d) Potential for onshore placement of electrical-power-producing equipment (including hydraulic motors and electrical generators) also enables easy access for inspection and maintenance.
(e) Key components such as the vessel, piston and others are only under minor stresses.
(f) The embodiments taught herein may be manufactured less expensively than most other equipment on the marketplace.
(g) Most of the components may be made of plastics or similar material thereby minimizing corrosion issues. For example, walls of vessel may be made of plastic or FIBERGLAS material or the like.
(h) As most of the equipment described here is placed at seabed, they are essentially immune to any raging storm conditions around the free surface of the sea.
(i) There is operational flexibility to move equipment to a different location based on the seasonal wave conditions.
(j) The equipment described involves no twisting or rotating components so that this equipment offers a high degree of reliability and durability.
(k) Since key components are fully submerged, the reducing environment (oxygen-deficient) substantially lowers the corrosion potential of metallic components.
(l) In shallow seas, the presence of the embodiments of the wave energy converter near seabed tends to increase the amplitude of the waves locally thereby increasing the power-producing potential.
(m) No robust anchoring of wave energy converter to seabed is needed, and its weight itself should be sufficient to prevent any undesirable displacement resulting from ocean currents.

The embodiments presented here are most suitable to be used in shallow seas (up to 30 or 40 m) as inspection and maintenance can be carried out by SCUBA divers.

The embodiments presented here may be used in deeper oceans (greater than 30 or 40 m) and provide inspection and maintenance with the help of self-propelled autonomous robots owing to the simplicity of the embodiments. Autonomous robots may also be used for routine inspection and minor maintenance work in shallow seas as well.

In case the embodiments need to be placed on seabed having corals, it is quite possible to relocate the affected corals from the sea floor to the top surface of the device. In this manner, sea life would be left essentially unchanged."

In addition to the primary objective of producing "green" energy, the embodiments presented here lead to: (a) reducing of coastal erosion with minimal impact on shoreline aesthetics, (b) lowering of water temperatures in coastal regions and thereby lowering of humidity levels resulting in increased human comfort, (c) lowering of water temperatures in coastal regions also leads to reduced air-conditioning costs, and (d) the area underneath vessel would provide habitats for fish and other sea life, which would help increase production of seafood for local communities.

BRIEF DESCRIPTION OF DRAWINGS

The drawings illustrate preferred embodiments of the wave energy converter according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 3C shows an end view of FIG. 3A;

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1A:
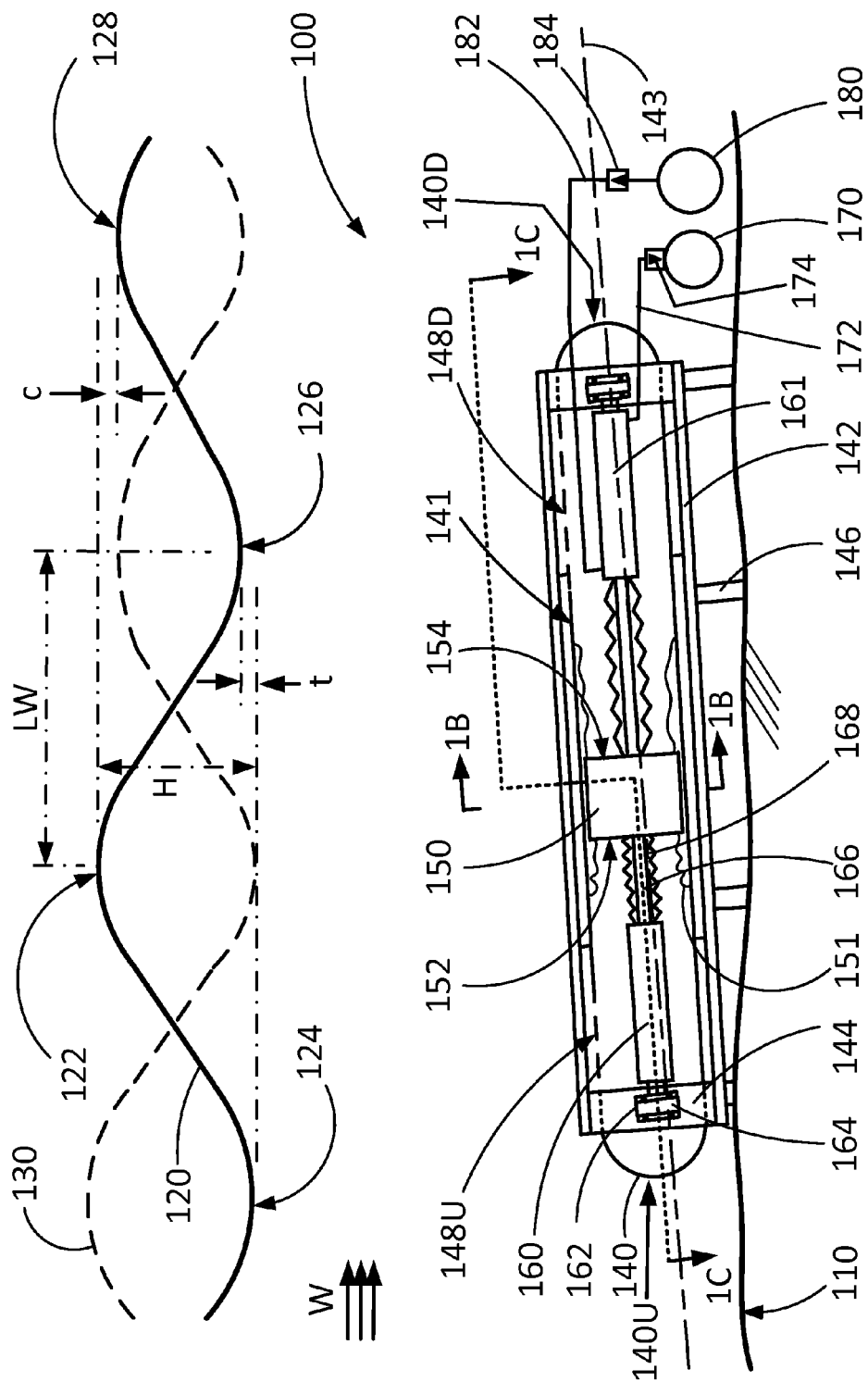
FIG. 1A shows a sectional front view of a first embodiment of the wave energy converter placed on the seabed.

FIG. 1A shows a first embodiment (100) of the wave energy converter placed on the seabed (110) and a first wave (120) transiting over the wave energy converter on the surface of a body of water. The "body of water" is also referred to herein as an ocean or a sea, and may also be a lake of sufficient size to generate waves. The terms "water" and "seawater" are also used interchangeably herein, unless the designation "fresh water" is used, which means water without salt. The primary wave direction is shown by three arrows labeled as "W".

The first wave (120) has a first crest (122), a first trough (124) and a second trough (126). Similarly, a second crest (128) occurs some distance away from the first crest (122). The distance between the first crest (122) and the second trough (126) represents one half of ocean wave length, is identified as "LW" in FIG. 1A.

Figure 1B:
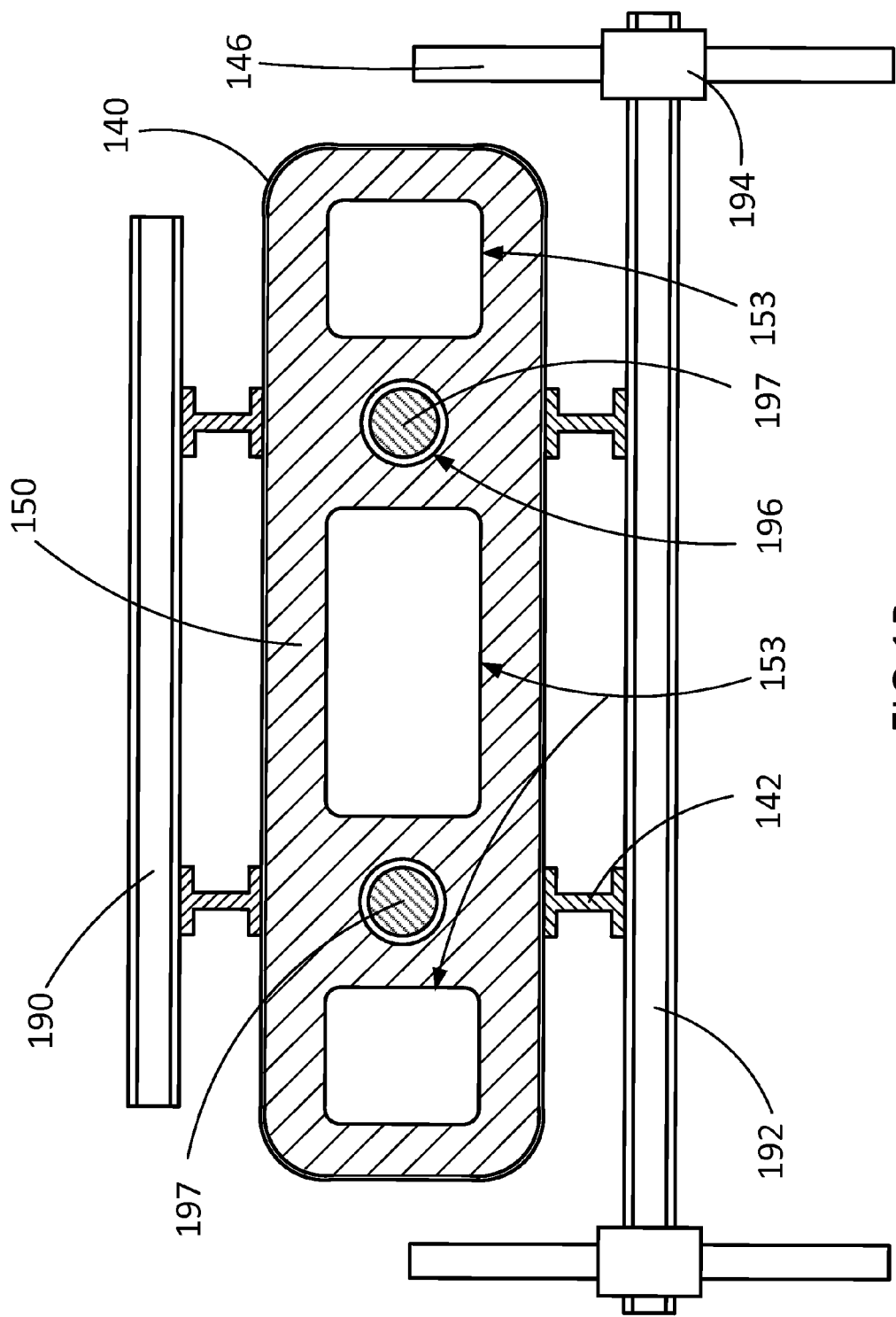
FIG. 1B shows a sectional end view along 1B-1B of FIG. 1A.

FIG. 1A also shows a cross-sectional view of the first embodiment (100) of the wave energy converter that includes a first vessel (140). The first vessel (140) can have any reasonable cross-section. The view at section line 1B-1B is shown in FIG. 1B and this illustrates an elongated cross-section.

The first vessel (140) is strengthened by horizontal beams (142) and vertical beams (144). Preferably, the horizontal beams (142) are located on the outside of the first vessel (140) while the vertical beams (144) preferably penetrate walls of the first vessel (140).

Preferably, the horizontal beams (142) and the vertical beams (144) are firmly interconnected to each other resulting in a sturdy structure. In addition, the horizontal beams (142) are preferably supported by top beams (190) and bottom beams (192).

The first vessel (140) is firmly placed on the seabed (110), preferably secured to the seabed (110) using first adjustable legs (146). These first adjustable legs (146) are preferably attached to the bottom beams (192) via a height-adjustment mechanism (194). The first adjustable legs (146) enable placement of the first vessel (140) as necessary regardless of actual shape of terrain at the seabed (110). As seen in FIG. 1A, the first vessel (140) is preferably adjusted using the terrain or the first adjustable legs (146) to be slightly inclined upward toward the downstream end (140D) relative to wave direction "W".

At least one upstream opening (148U) and at least one downstream opening (148D) are provided on the top surface (141) of the first vessel (140). The upstream opening (148U) is provided near the upstream end (140U) of the first vessel (140) relative to wave direction "W," while the downstream opening (148D) is provided near the downstream end (140D) of the first vessel (140). The upstream opening (148U) of the first vessel (140) is configured to reside below the first crest (122) when the downstream opening (148D) resides below the first trough (124).

A first piston (150) having an upstream face (152) and a downstream face (154) is slidably secured within the first vessel (140) between the upstream opening (148U) and the downstream opening (148D). Slidability of the first piston (150) is preferably provided by at least two openings each having a bearing surface (196) defined through the first piston (150) along the longitudinal axis (143) direction.

Figure 1C:
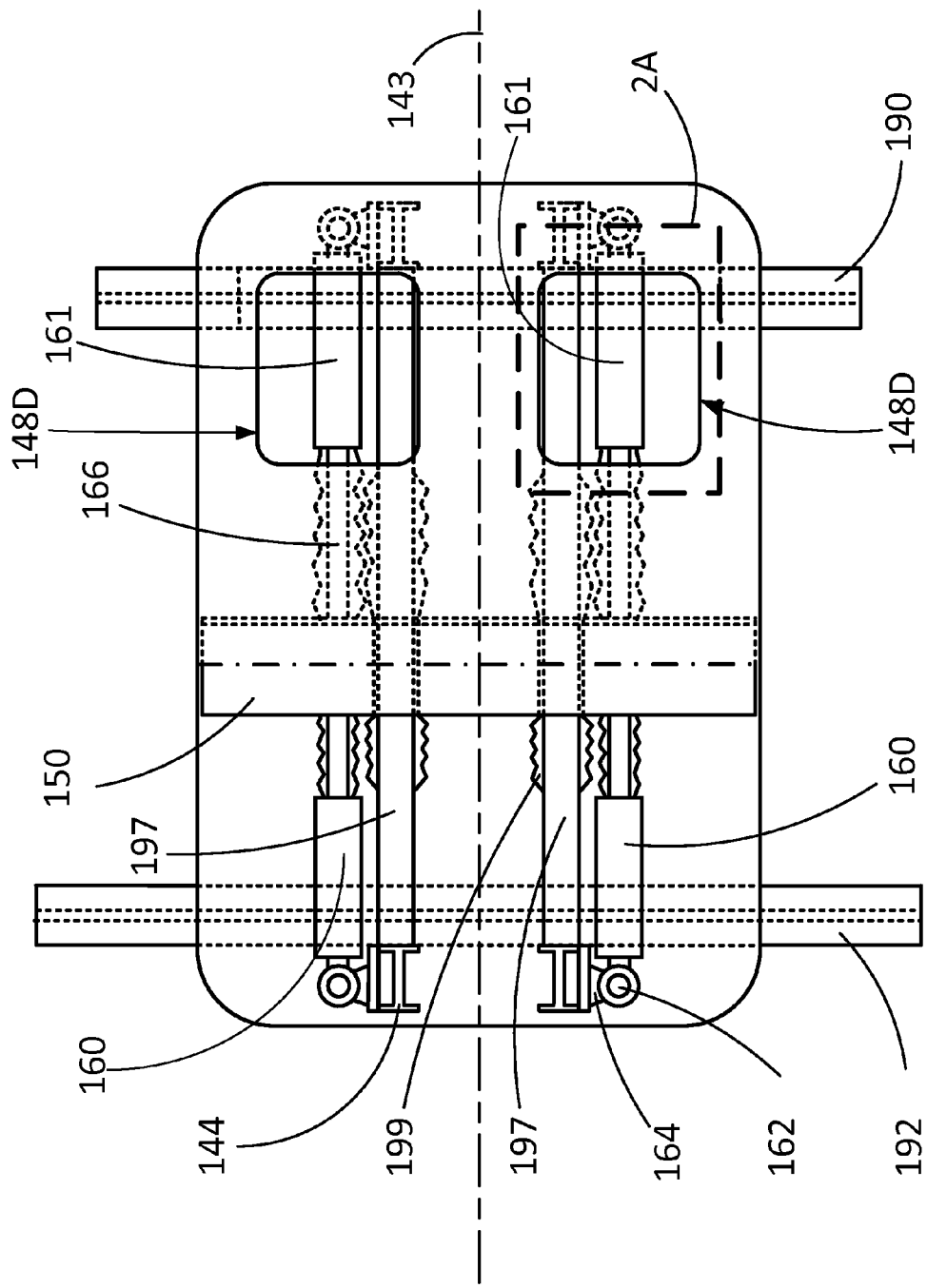
FIG. 1C shows a sectional plan view along 1C-1C of FIG. 1A.

Exemplar openings and bearing surfaces are shown in FIG. 1B and FIG. 1C. FIG. 1C is a partial sectional plan view along cut 1C-1C shown in FIG. 1A. A guide bar (197) for each opening is slidably inserted through each opening in the first piston (150) to enable the first piston (150) to ride along each such guide bar (197) (slide on them) and move in a fixed path. To avoid clutter, no guide bar (197) is shown in FIG. 1A and the guide bar (197) is shown in two locations in FIG. 1B and FIG. 1C.

The upstream opening (148U) and the downstream opening (148D) are used to subject the first piston (150) to a differential pressure and thereby cause it to slide within the first vessel (140) on each guide bar (197). The first piston (150) moves in reaction to the differential water pressure experienced at the upstream opening (148U) as compared to the downstream opening (148D). This differential water pressure is conveyed by the structure of the wave energy converter to opposing faces of the first piston (150). At maximum wave effect where the upstream opening (148U) is directly under the first crest (122) and the downstream opening (148D) is directly under the first trough (124) (or vice versa), the first piston (150) is subjected to the largest differential pressure between two opposing faces of the first piston (150), namely the pressure seen by the upstream face (152) compared to the pressure seen by the downstream face (154).

The end of each guide bar (197) is preferably firmly attached to one or more of the vertical beams (144). The clearance between bearing surface (196) within the opening and the guide bar (197) is preferably protected against encroachment of sand and marine organisms by a first impermeable sack (199), as shown in FIG. 1C. Any confined space created by the first impermeable sack (199) between the guide bar (197) and the first piston (150) is preferably filled with freshwater, which prevents sand and marine organisms from reaching this space.

Thus, the first piston (150) is slidably secured within the first vessel (140) between the upstream opening (148U) and the downstream opening (148D). The first piston (150) comprises an upstream face (152) and a downstream face (154). The first piston (150) is configured to slide within the first vessel (140) parallel to the longitudinal axis (143) in reaction to the differential water pressure acting between the upstream face (152) and the downstream face (154). The first piston (150) defines therewithin at least one lightweight cavity (153) between the upstream face (152) and the downstream face (154).

FIG. 1A also shows that one end of a flexible and a second impermeable sack (151) is preferably attached to first piston (150) and the other end of flexible and second impermeable sack (151) is attached to the interior of the first vessel (140). When used, the second impermeable sack (151) creates a confined space for clearance between the first vessel (140) and the first piston (150). This clearance may be preferably filled with freshwater thereby preventing sand and marine organisms from reaching this space.

Owing to the energy being absorbed by the first embodiment (100) of the wave energy converter, the second crest (128) occurs at a level lower than the first crest (122), as identified by label "c" shown in FIG. 1A. Similarly, the second trough (126) occurs at a level higher than the first trough (124), as identified by label V"t".

A preferred embodiment has at least one hydraulic cylinder at each end of the first vessel (140), namely an upstream hydraulic cylinder (160) and a downstream hydraulic cylinder (161). A second preferred embodiment has two upstream hydraulic cylinders and two downstream hydraulic cylinders, that is one set of two at each end of the first vessel (140), as shown in FIG. 1C. Alternatively, there may be more than two hydraulic cylinders at each end of the first vessel (140), as desired. Alternatively, only one hydraulic cylinder may be provided in first vessel (140), namely either an upstream hydraulic cylinder (160) or a downstream hydraulic cylinder (161), which may be of a single-acting system design or a double-acting system design hydraulic cylinder.

Thus, more than one upstream hydraulic cylinder (160) located on the upstream side of the first vessel (140) may be attached to the upstream face (152) of first piston (150). Attachment to the first piston (150) is preferably accomplished using a first shaft (166) for each hydraulic cylinder. Similarly, more than one downstream hydraulic cylinder (161) located near the downstream end (140D) of the first vessel (140) may be attached to the downstream face (154) of the first piston (150) via the first shaft (166).

The first shaft (166) is protected from the harsh environment by means of an expandable, impermeable membrane (168). The non-moving end of each upstream hydraulic cylinder (160) is attached to the interior of the first vessel (140) via a bolt (162) and a clevis (164), as shown in FIG. 1A. To simplify the drawing, each upstream hydraulic cylinder (160) is shown with a single-acting system design. However, the use of a double-acting system design is the most suitable option for the upstream hydraulic cylinder (160). In a double-acting system design, the upstream hydraulic cylinder (160) has two connections for high-pressure fluid: one for when the first piston (150) moves toward the upstream end (140U) and one for when the first piston (150) moves toward the downstream end (140D). Thus, a preferable embodiment includes an upstream hydraulic cylinder (160) that includes a double-acting system design. The double-acting system design means that the upstream hydraulic cylinder (160) is also configured to supply pressurized fluid to the high-pressure manifold (170) when the upstream face (152) of the first piston (150) moves away from the upstream hydraulic cylinder (160).

The high-pressure outlet line from each upstream hydraulic cylinder (160) may be connected to a high-pressure manifold (170) through a high-pressure hose (172) and a one-way high-pressure valve (174). Similarly, the low-pressure inlet line to each upstream hydraulic cylinder (160) may be attached from a low-pressure manifold (180) via a low-pressure hose (182) and a one-way low-pressure valve (184). These features are shown in FIG. 1A for the downstream hydraulic cylinder (161), and these features are similar to those not shown for the upstream hydraulic cylinder (160), which were not shown to simplify the drawing.

The first piston (150) is preferably configured with at least one light-weight cavity (153) to achieve a nearly neutrally buoyant design. The light-weight cavity (153) may be filled with a water-resistant closed-cell extruded polystyrene foam, such as for example STYROFOAM, or may be empty cavities preferably lined with a lightweight material, such as plastic or metallic materials.

The light-weight cavity (153) enables the first piston (150) to be nearly neutrally buoyant. When the first piston (150) is roughly neutrally buoyant the first piston (150) is optimized for energy conversion because it helps to minimize sliding friction between the bearing surface (196) and each guide bar (197). Such a design would minimize wearing of the bearing surface thereby improving the reliability and durability of the sliding components.

Alternatively, the light-weight cavity (153) results in an overall density of the first piston (150) that is slightly denser than water. Preferably, the overall density of first piston (150) is around 1075 kg/m$^3$ compared to the density of seawater of around 1030 kg/m$^3$.

Thus, two preferable designs are considered relevant: One in which the first piston (150) defines a light-weight cavity (153) between the upstream face (152) and the downstream face (154) to result in a substantially neutrally buoyant first piston; and another in which the first piston (150) defines the light-weight cavity (153) between the upstream face (152) and the downstream face (154) to result in an overall density of the first piston (150) that is slightly greater than the density of water.

FIG. 1C also shows two upstream hydraulic cylinders and two downstream openings at downstream end (140D) of the first vessel (140). FIG. 1C also shows that all corners of the first vessel (140) are rounded to minimize fluid drag forces. For simplicity, FIG. 1C does not show first adjustable legs (146).

Figure 2A:
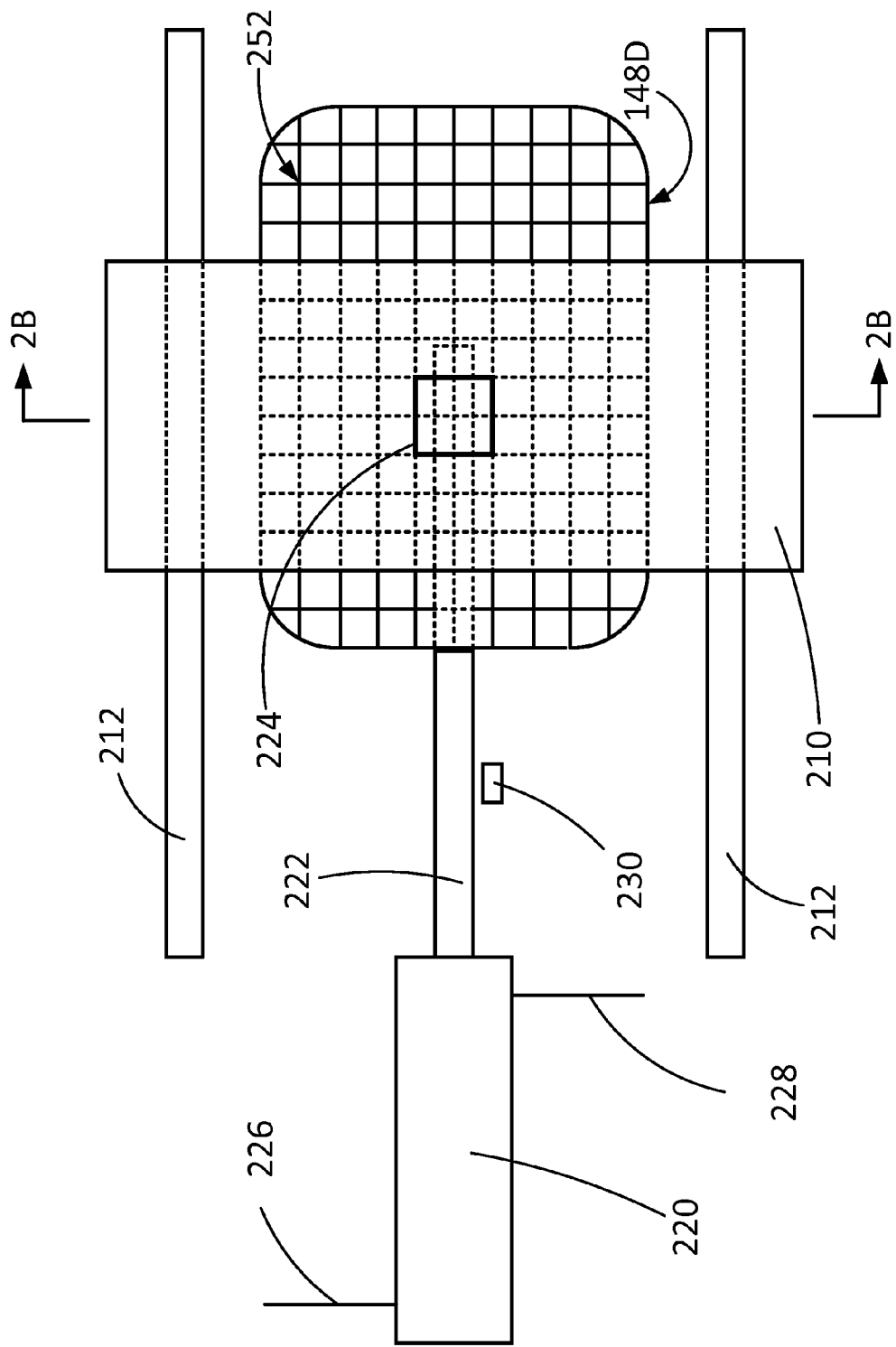
FIG. 2A shows a partial view of FIG. 1B illustrating the details of adjustable openings of wave energy converter.

FIG. 2A shows an enlarged partial view of a segment 2A identified in FIG. 1C. FIG. 2A reveals more details around downstream opening (148D) located on the downstream end (140D) of the first vessel (140).

As shown, downstream opening (148D) may be provided with a grid (252), also referred to as a screen, to minimize debris and marine life getting into the interior of the first vessel (140).

Figure 2B:
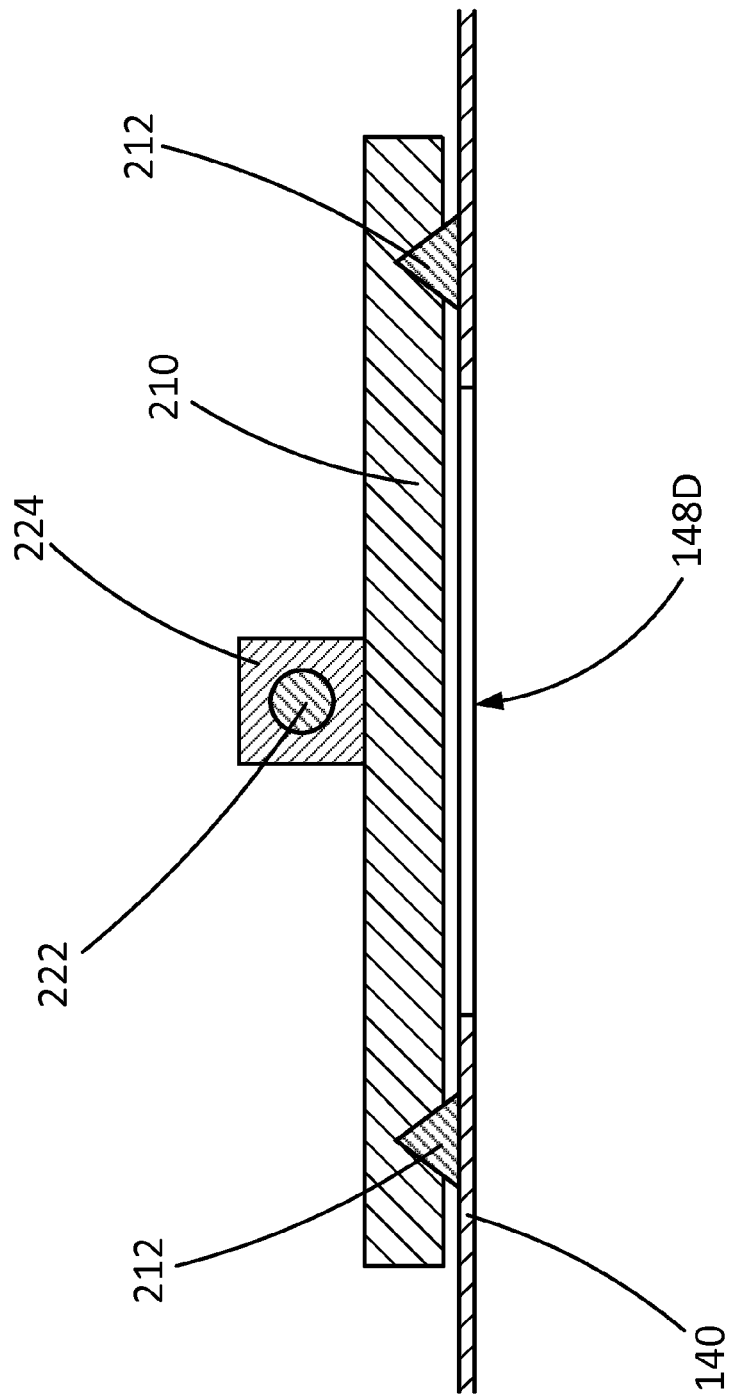
FIG. 2B shows a sectional view along 2B-2B of FIG. 2A.

FIG. 2A shows that each downstream opening (148D) at the downstream end (140D) of the first vessel (140) may be provided with a cover plate (210). The cover plate (210) is placed and properly guided by a guide rail (212) on each side. Cover plate (210) is firmly attached via a block (224) to a second shaft (222) that is part of a hydraulic actuator (220), as shown. The hydraulic actuator (220) is provided with a hydraulic inlet line (226) and a hydraulic outlet line (228). The hydraulic inlet line (226), the hydraulic outlet line (228) and a position sensor (230) enable remote adjustment of the position of the cover plate (210). Such adjustment of the cover plate (210) position enables optimization of power generation by responding to seasonal variations in the wave length of ocean waves. Such adjustment alters the distance between the upstream opening (148U) and the downstream opening (148D). FIG. 2B shows a sectional view along 2B-2B shown in FIG. 2A to further illustrate arrangement of the cover plate (210) and the guide rail (212).

Thus, the first embodiment (100) of the wave energy converter may include a cover plate (210) for each downstream opening (148D), the cover plate (210) slidably positioned over each such downstream opening (148D); a hydraulic actuator (220) connected to each such cover plate (210), the hydraulic actuator (220) configured to enable slidably positioning the cover plate (210) to alter the distance between the upstream opening (148U) and the downstream opening (148D); and a position sensor (230) for each such cover plate (210), the position sensor (230) configured to enable remote adjustment of the position of the cover plate (210). The same configuration may also be provided for the upstream opening (148U) so as to reshape the upstream opening (148U) to be under the first crest (122) when the downstream opening (148D) is under the first trough (124).

Positional changes of cover plate (210) and the adjustment of the hydraulic pressure within high-pressure manifold (170) may be used to optimize the power-generating potential based on the wave conditions. For example, for an increased power production, the distance between upstream opening (148U) and downstream opening (148D) should be approximately equal to "LW" shown in FIG. 1A. As mentioned earlier, seasonal changes are best achieved by the positional changes of the cover plate (210), while more rapid (e.g., daily or weekly) changes may be dealt with adjustment of the hydraulic pressure within the high-pressure manifold (170).

As the first crest (122) places itself above the upstream opening (148U) on the upstream end (140U) of the first vessel (140), and the second trough (126) roughly places itself above the downstream opening (148D) on the downstream end (140D) of the first vessel (140), a pressure difference equivalent to a water height of "H" occurs on the upstream face (152) and the downstream face (154) of the first piston (150). In other words, the net force, acting from left to right, applied on the first piston (150) would be equal to "H×density of seawater×gravitational acceleration×area of piston." For example, with an H value of 3 m and a piston area of 5 m$^2$, the resulting net force is approximately 3×1030×9.81×5=151.6 kN (or 15.45 ton); the density of seawater is taken as 1030 kg/m$^3$ while the gravitational acceleration is generally around 9.81 m/s$^2$. Of course, as the wave propagates, this force varies from zero to a value of 151.6 kN and an average force of 75.8 kN (7.7 ton) may be considered for simplicity. Assuming that this average force moves the first piston (150) over a distance of 1 meter in 3 seconds, the power imparted to the hydraulic fluid is approximately 75.8/3=25.3 kW.

Once the net force on first piston (150) becomes zero and the wave propagates further, the direction of the net force reverses itself. In other words, as a second wave (130) reaches the position shown in FIG. 1A, the maximum net force acting from the downstream end (140D) to the upstream end (140U) occurs on the first piston (150).

In response to a net force acting from the downstream end (140D) to the upstream face (152) of the first piston (150), the first piston (150) moves leftward and theoretically to its leftmost position. However, as indicated earlier, if the first vessel (140) is placed horizontally, owing to extraction of energy from the ocean waves, the first piston (150) may not return to its original position on the left side. To compensate for this deficiency, the first vessel (140) is preferably slightly inclined upward at the downstream end (140D) so that gravitational forces acting on the first piston (150) toward the upstream end (140U) will assist in maximizing the energy extraction potential. Also, having the first piston (150) be slightly denser than seawater as described earlier would assist in this function. The longitudinal axis (143) is substantially horizontal and in a preferred embodiment shown in FIG. 1A, the longitudinal axis (143) is slightly inclined so as to rise from a position close to the seabed (110) at the upstream end (140U) to a higher elevation above the seabed (110) at the downstream end (140D).

Figure 3A:
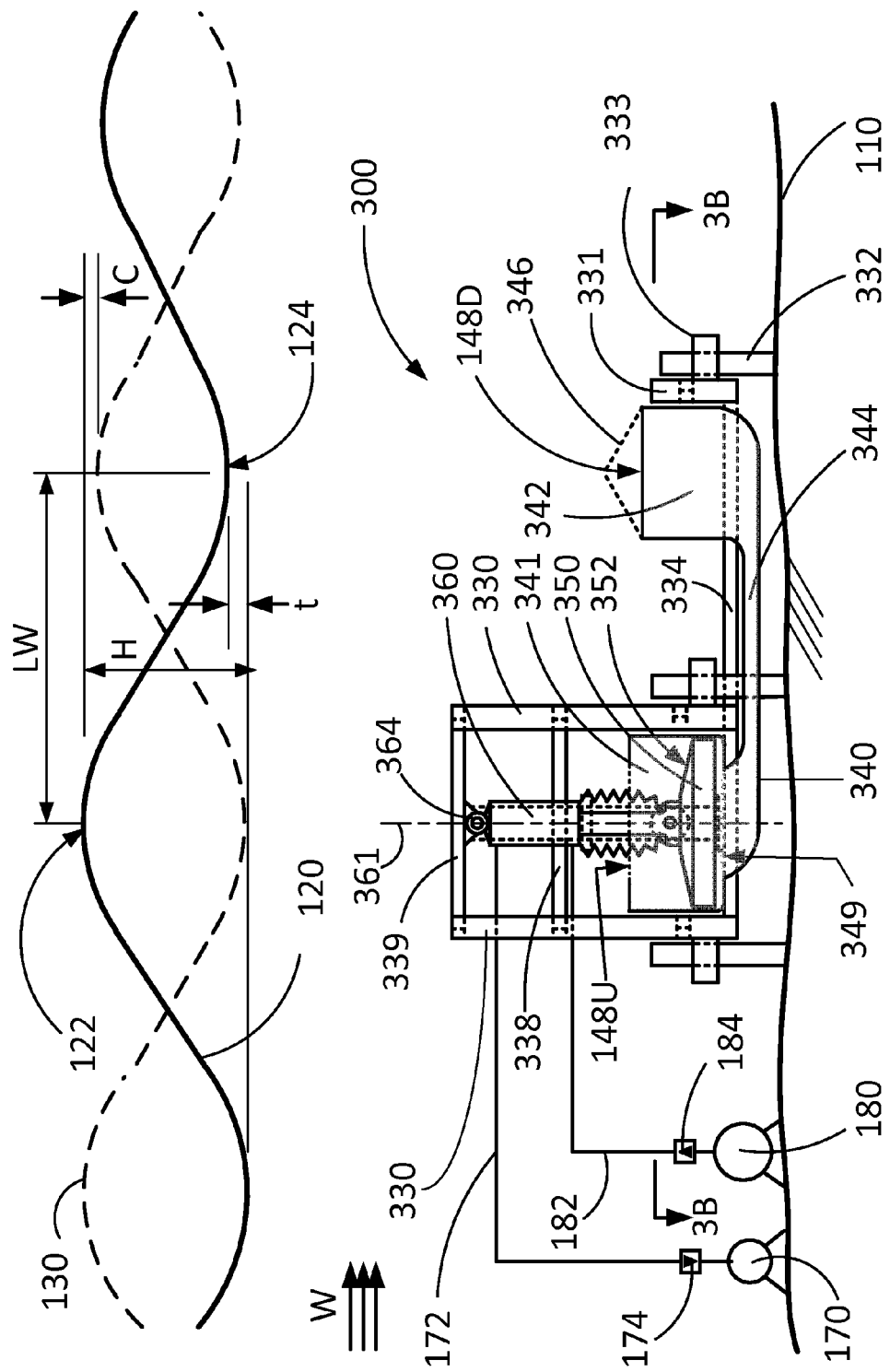
FIG. 3A shows a front view of a second embodiment of the wave energy converter placed on the seabed.

FIG. 3A shows a second embodiment (300) of the wave energy converter primarily oriented in the vertical direction. FIG. 3A is a front view of the second embodiment (300) of the wave energy converter that has components including a second vessel (340), a second piston (350) and a second hydraulic cylinder (360). The second vessel (340) is lightly shaded in FIG. 3A and includes a vertical upstream duct (341), a vertical downstream duct (342) and a horizontal duct (344). As can be seen in FIG. 3A, the second vessel (340) is shaped somewhat like the letter "u" or even a backward "J".

The second embodiment (300) of the wave energy converter is configured to be located in the body of water adjacent to the seabed (110). The second embodiment (300) of the wave energy converter preferably holds the components within a framed structure. The framed structure may have second adjustable legs (332). The framed structure preferably includes and is defined by horizontal bottom beams (334), horizontal middle beams (335), horizontal top beams (336), long crosswise beams (337), at least one stiffener beam (338), and horizontal top cross beams (339).

The framed structure enables the vertical upstream duct (341) and the vertical downstream duct (342) to be supported and strengthened by several tall columns (330) and several horizontal top beams (336). The horizontal top beams (336) are firmly attached to the tall columns (330). The second vessel (340) and the vertical downstream duct (342) are placed on the horizontal bottom beams (334) that are, in turn, attached to the tall columns (330) as well as to the long crosswise beams (337). The second vessel (340) and the vertical downstream duct (342) are firmly placed on the seabed (110), optionally using a multitude of the second adjustable legs (332). One or more vertical ducts may be supported by short columns (331), as well. These second adjustable legs (332) are attached to the tall columns (330) and the short columns (331) via a second height-adjustment mechanism (333). The second adjustable legs (332), if used, enable optimized placement of the second vessel (340), regardless of actual shape of terrain of the seabed (110).

The vertical upstream duct (341) includes and/or defines an upstream opening (148U) at one end and an intermediate opening (349) at the other end. The intermediate opening (349) is configured to be below the upstream opening (148U). The intermediate opening (349) essentially sees the same water pressure as is seen by the downstream opening (148D) in the vertical downstream duct (342). The vertical upstream duct (341) is configured to reside below the first crest (122) when the vertical downstream duct (342) resides below the first trough (124).

The vertical downstream duct (342) includes and/or defines a downstream opening (148D) that is configured to be below the first trough (124) when the upstream opening (148U) is below the first crest (122).

The adjective "vertical" in the names "vertical upstream duct" and "vertical downstream duct" is not intended to be a precise designation, only a general orientation of an up and down position. In this sense, even an orientation 45 degrees off the vertical direction is included in the definition of "vertical" intended herein.

The horizontal duct (344) flowably connects the vertical upstream duct (341) to the vertical downstream duct (342). Here again, the adjective "horizontal" is intended to be a general orientation where even an orientation 45 degrees off the horizontal orientation is included in the definition of "horizontal" intended herein.

Figure 3B:
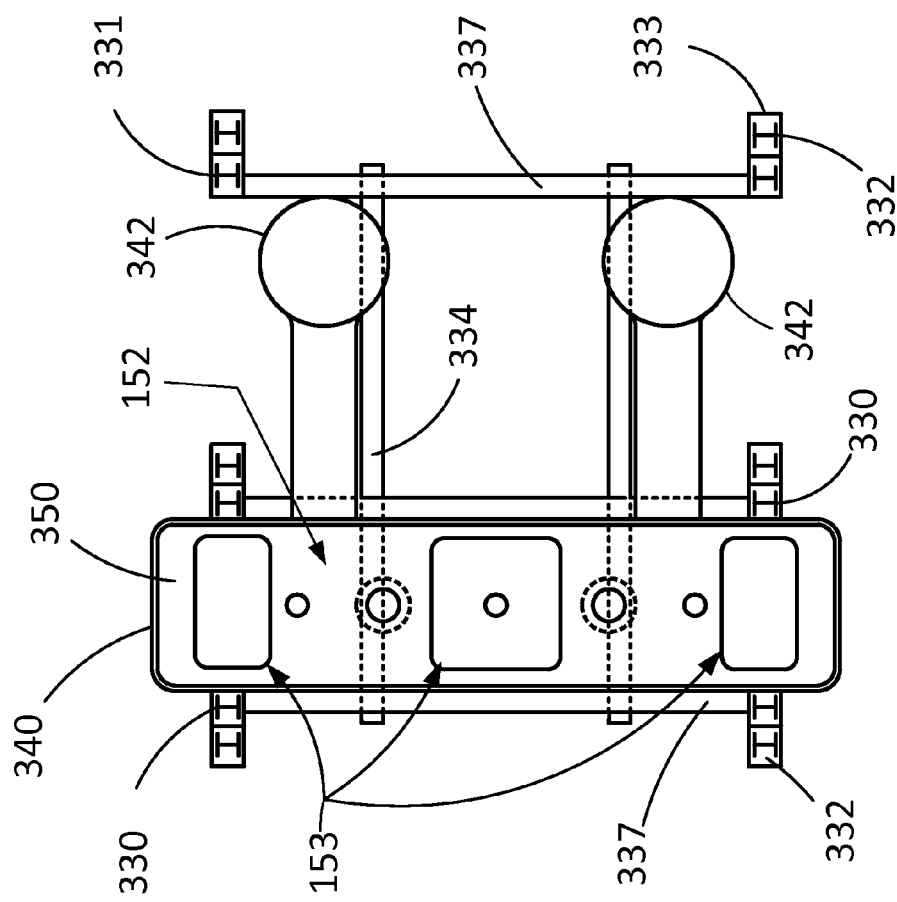
FIG. 3B shows a sectional plan view along 3B-3B of FIG. 3A.

The vertical upstream duct (341) provides a means to constrain and guide the movement of the second piston (350). The second vessel (340) may have any reasonable cross-section; for example, FIG. 3B shows an elongated cross-section. The second vessel (340) has a vertical axis that is preferably oriented substantially perpendicularly to the surface (715) of the body of water. An orientation that is perpendicular is optimum. However, due to the variability in the slope of the seabed (110), the second vessel (340) may be inclined up to 45 degrees from the perpendicular to the surface (715) of the body of water in preferable embodiments of the wave energy converter. The vertical axis is an imaginary line that preferably runs approximately perpendicularly to the upstream opening (148U).

The vertical upstream duct (341) includes an upstream opening (148U) that is positioned furthest from the seabed (110). The upstream opening (148U) is preferably and approximately within a plane that is approximately parallel to the surface (715) of the body of water. The upstream opening (148U) is essentially an inlet for seawater when the first crest (122) of the wave is aligned with the vertical axis (361) over the upstream opening (148U). The upstream opening (148U) is also essentially an outlet for seawater when the first crest (122) of the wave is aligned over the vertical downstream duct (342).

The vertical upstream duct (341) includes an intermediate opening (349) configured to be below the upstream opening (148U). The intermediate opening (349) is also preferably oriented so as to be in a plane that is approximately perpendicular to the vertical axis (361). When the second piston (350) is present within the vertical upstream duct (341), the intermediate opening (349) is below the second piston (350) and is essentially at the same water pressure as at the downstream opening (148D).

The horizontal duct (344) is positioned below the second vessel (340). The horizontal duct (344) extends away from the second vessel (340) to a distal point away from the second vessel. The distal point preferably being at the distance from the vertical upstream duct (341) equal to the distance from the first crest (122) to the first trough (124). Thus, the upstream opening (148U) and the intermediate opening (349) are configured to reside below the first crest (122) when the vertical downstream duct (342) and the downstream opening (148D) lie below the first trough (124).

Preferably, the screen (346) is attached to the vertical downstream duct (342) to prevent infiltrations other than seawater. Thus, the screen (346) is attached to the vertical downstream duct (342) so as to filter water entering the downstream opening (148D). Preferably, the screen (346) has a conical shape that enlists gravity to cause sand to fall off and that will keep large fish from entering interior portions of the vertical downstream duct (342) and the horizontal duct (344).

The second piston (350) is slidably secured within the vertical upstream duct (341) between the upstream opening (148U) and the intermediate opening (349). The second piston (350) has an upstream face (152) flowably connected to the upstream opening (148U) and a downstream face (154) flowably connected to the downstream opening (148D) through the intermediate opening (349).

The second piston (350) is configured to slide up and down within the vertical upstream duct (341) in reaction to differential water pressure acting between the upstream face (152) and the downstream face (154). The second piston (350) is guided by vertical runners (320), as shown in FIG. 3C (each vertical runner is similar in design and purpose to the guide bar (197), discussed above). The second piston (350) is preferably provided with a conical end (352) at the top to minimize accumulation of any debris or sand that would occur otherwise if a flat top is made available.

The vertical runners (320) are firmly attached to horizontal top cross beams (339) and stiffener beam (338), as shown in FIG. 3A. Each of the vertical runners (320) is preferably provided with an upper stopper (322) and a lower stopper (324). The upper stopper (322) and the lower stopper (324) provide a predetermined range for movement of second piston (350).

The space between the vertical runners (320) and the second piston (350) is preferably protected against encroachment of seawater and marine organisms by providing a flexible and impermeable membrane, similar to the impermeable membrane (168) used on the first shaft (166) of the upstream hydraulic cylinder (160), as shown in FIG. 1A and FIG. 1C, but it is not shown in FIG. 3C to enhance clarity of the drawing. The clearances between the second vessel (340) and the second piston (350) are similarly protected (not shown) by the use of impermeable membranes.

The second piston (350) is preferably provided with at least one light-weight cavity (153). Each light-weight cavity (153) may be made of water-resistant STYROFOAM or empty containers preferably made of plastic or metallic materials.

The light-weight cavity (153) is located between the upstream face (152) and the downstream face (154) to result in a second piston (350) that is substantially neutrally buoyant. A second piston (350) that is nearly neutrally buoyant maximizes energy conversion by minimizing frictional forces between second piston (350) and vertical runners (320).

Alternatively, the light-weight cavity (153) results in an overall density of the second piston (350) that is slightly less dense than water. Preferably, for this alternative embodiment, the overall density of second piston (350) may be around 950 kg/m3 compared to the density of seawater of around 1030 kg/m3.

Thus, two preferable designs are considered relevant: One in which the second piston (350) defines a light-weight cavity (153) between the upstream face (152) and the downstream face (154) to result in a second piston (350) that is substantially neutrally buoyant; and another in which the second piston (350) defines a light-weight cavity (153) between the upstream face (152) and the downstream face (154) to result in an overall density of the second piston (350) that is slightly less than the density of water.

In operation, as the first crest (122) places itself roughly above the vertical upstream duct (341) and the first trough (124) places itself roughly above vertical downstream duct (342), a net downward force occurs on the second piston (350). This downward force moves the second piston (350) downward and the second piston (350) pushes seawater through the horizontal duct (344) and then through and out of the vertical downstream duct (342). Similarly, as the wave passes and the crest of second wave (130) places itself roughly above the vertical downstream duct (342) and the trough of second wave (130) places itself roughly above the vertical upstream duct (341), a net force acts vertically upwards on the second piston (350). This force moves the second piston (350) upwards roughly to its top-most position.

Thus, the second piston (350) is slidably secured within the vertical upstream duct (341) between the upstream opening (148U) and the intermediate opening (349) of the vertical upstream duct (341). The second piston (350) includes an upstream face (152) and a downstream face (154), shown in FIG. 3C. The second piston (350) is preferably configured to slide within the second vessel (340) parallel to the vertical axis (361) in reaction to differential water pressure acting between the upstream face (152) and the downstream face (154).

The second hydraulic cylinder (360) is fixedly attached to the framed structure and attached to the second piston (350) via a second shaft (366), the second hydraulic cylinder (30) is configured to provide a pressurized fluid to a high-pressure manifold (170) when the upstream face (152) of the second piston (350) moves toward the second hydraulic cylinder (360).

FIG. 3C shows three second hydraulic cylinders but one or any reasonable number of hydraulic cylinders may be used. When more than one second hydraulic cylinder (360) is used, it is preferable that there be an even number for balancing forces on second piston (350). Each second hydraulic cylinder (360) is firmly attached to horizontal top cross beams (339) and stationary shafts (364) as shown in FIGS. 3A and 3C. Each second hydraulic cylinder (360) is also firmly attached to horizontal middle beams (335) as well.

As seen in FIG. 3C, a second shaft (366) in each second hydraulic cylinder (360) is firmly attached to second piston (350), as shown in FIG. 3A. Preferably, the second shaft (366) is protected from harsh environment by means of an expandable impermeable sack (368).

To simplify the drawings, each second hydraulic cylinder (360) is shown with a single-acting design. However, the use of a well-known double-acting system is considered a superior option, as discussed above for the first embodiment (100) of the wave energy converter. In a double-acting system, the second hydraulic cylinder (360) is configured to supply pressurized fluid to the high-pressure manifold (170) when the upstream face (152) of the second piston (350) moves away from the second hydraulic cylinder (360).

Referring to FIG. 3A, a pressurized outlet stream from each second hydraulic cylinder (360) is preferably connected to the high-pressure manifold (170) through the high-pressure hose (172) and the one-way high-pressure valve (174). Similarly, a low-pressure replacement stream to each second hydraulic cylinder (360) is provided from the low-pressure manifold (180) via the low-pressure hose (182) and the one-way low-pressure valve (184).

Figure 4:
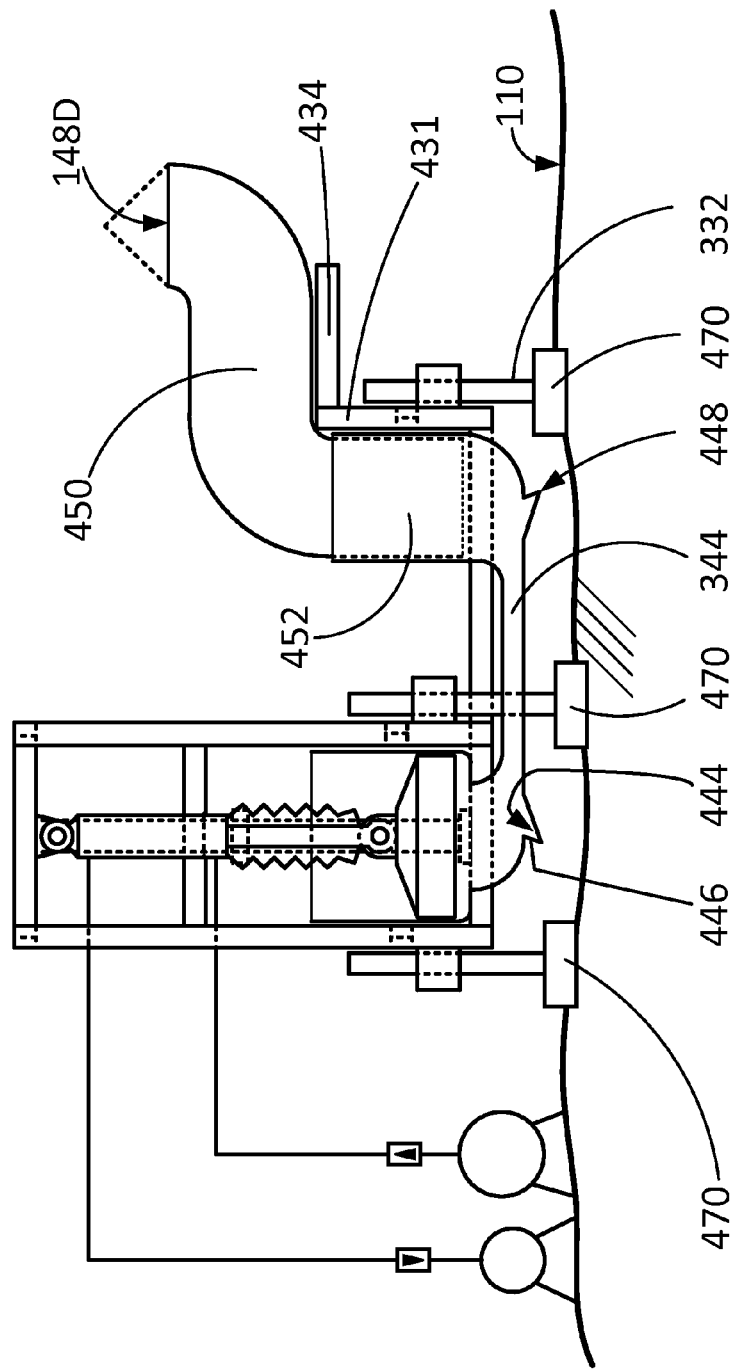
FIG. 4 shows a view similar to FIG. 3A but illustrating the details of an adjustable critical dimension of the wave energy converter.

FIG. 4 shows a view similar to that shown in FIG. 3A where three preferable and additional elements may be added to the embodiment of FIG. 3A.

The first such element is a duct extender (450) that extends vertical downstream duct (342). Duct extender (450) has a straight duct portion (452) that substantially engages into vertical downstream duct (342). By pivotally rotating duct extender (450) around vertical centerline of vertical downstream duct (342), the horizontal distance between upstream opening (148U) and downstream opening (148D) can be adjusted to respond to variations in ocean wave length. In order to support and strengthen duct extender (450), short column (331) has been replaced by an extended column (431). In addition, a horizontal extender beam (434) is attached to extended column (431) thereby providing substantial support to duct extender (450).

The second such element is a slanted depression (444). This is also described as a low point on the horizontal duct (344). This low point is a point on the horizontal duct (344) that is closest to the seabed (110) and is preferably a defined and intentional depression in the horizontal duct (344). Preferably, the low point is on a bottom surface of the horizontal duct (344). Preferably, the low point is a slanted depression (444) into which may be added a swivel door (446) for access to the inside of the horizontal duct (344). The swivel door (446) may be biased in the closed position but opened by the weight of sand within the horizontal duct (344). There may be more than one such low point, slanted depression (444), and swivel door (446).

The swivel door (446) is preferably provided against slanted depression (444). Slanted depression (444) and swivel door (446) enable automatic removal of any sand being accumulated at the bottom through a clearance (448) of horizontal duct (344) by the weight of the sand being accumulated. Swivel door (446) may also be manually operated to remove sand from horizontal duct (344).

The third such element is a plurality of second adjustable legs (332). The plurality of second adjustable legs (332) may be supplemented with one or more concrete blocks (470) to provide further stability to second embodiment (300) of the wave energy converter. Such concrete blocks (470) may also be provided at the bottom of first adjustable legs (146) shown in FIG. 1B.

In operation, the second embodiment of the wave energy converter also extracts the potential energy of a surface wave that exists between the wave crest and the wave trough. Referring to FIG. 3A, as first crest (122) places itself above the vertical upstream duct (341) of the second vessel (340) and first trough (124) roughly places itself above vertical downstream duct (342), a pressure difference equivalent to a water height of "H" occurs on second piston (350) in the vertically downward direction.

In other words, a net force acting downward occurs on the second piston (350) and this net force would be equal to "H×density of seawater×gravitational acceleration×area of piston". For example, with an H value of 3 m and a piston area of 5 m$^2$, the resulting net force is approximately 3×1030×9.81×5=151.6 kN (or 15.45 tons); the density of seawater is taken as 1030 kg/m$^3$ while the gravitational acceleration is generally around 9.81 m/s$^2$. Of course, as the wave propagates, this force varies from zero to a value of 151.6 kN and a conservative average force of 75.8 kN (7.7 ton) may be considered for simplicity. Assuming that this average force moves second piston 350 over a distance of 1 meter in 3 seconds, the power imparted to the hydraulic fluid is approximately 75.8/3=25.3 kW.

Once the net force on second piston (350) becomes zero and the wave propagates further, the direction of the net force reverses itself. In other words, as a second wave (130) reaches the position shown in FIG. 3A, the maximum net force acting vertically upwards occurs on second piston (350).

In response to a net force that would be acting upwards, the second piston (350) moves up to near its top-most position. However, as mentioned earlier, owing to absorption of energy from the ocean wave, the second piston (350) may not return to its original position. On the other hand, slightly less denser-than-seawater, second piston (350) that was mentioned previously would alleviate this deficiency.

Figure 5:
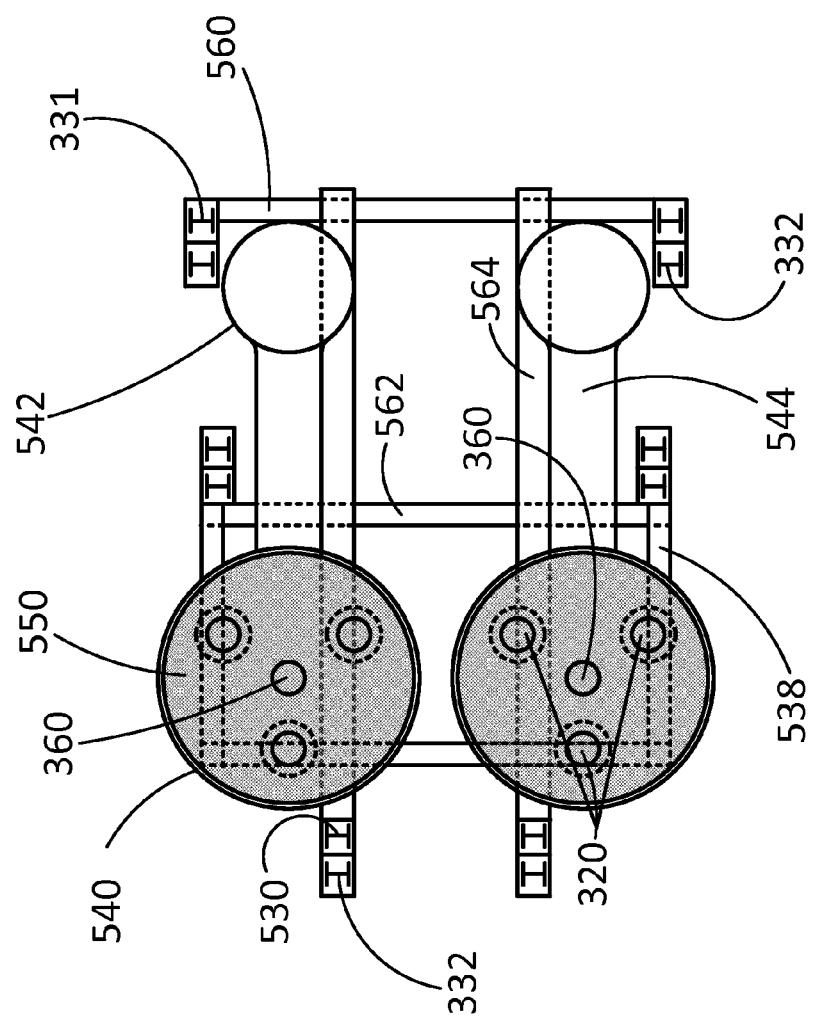
FIG. 5 shows a view similar to FIG. 3B but showing two separate pistons representing another embodiment.

FIG. 5 shows a view similar to FIG. 3B, but circular vessels (540) (outer circle) are two in number and are separate from each other. These two vessels replace the second vessel (340), which is elongated as shown in FIG. 3B. Also, second piston (350), shown in FIG. 3B as having an elongated shape, has been replaced by two circular pistons (550) (inner shaded circle). Circular vessels (540), circular pistons (550), vertical second ducts (542) and horizontal second ducts (544) shown in FIG. 5 are supported and strengthened by a collection of horizontal long beams (564), horizontal outer beam (560), horizontal cross beams (562), horizontal short beams (538) as well as vertical columns (530), and second adjustable legs (332). FIG. 5 also conceptually shows three vertical runners (320) vertical guides and a second hydraulic cylinder (360) in each of the circular vessels (540). Preferably, there are three vertical runners (320), as shown, to achieve a balance of forces on circular piston (550). Preferably, upper stoppers (322) and lower stoppers (324), as shown in FIG. 3C, limit travel of the circular pistons (550). Furthermore, more than one second hydraulic cylinder (360) may be attached to the top surface of each of the circular pistons (550), preferably arranged to balance forces acting on circular pistons (550).

Figure 6:
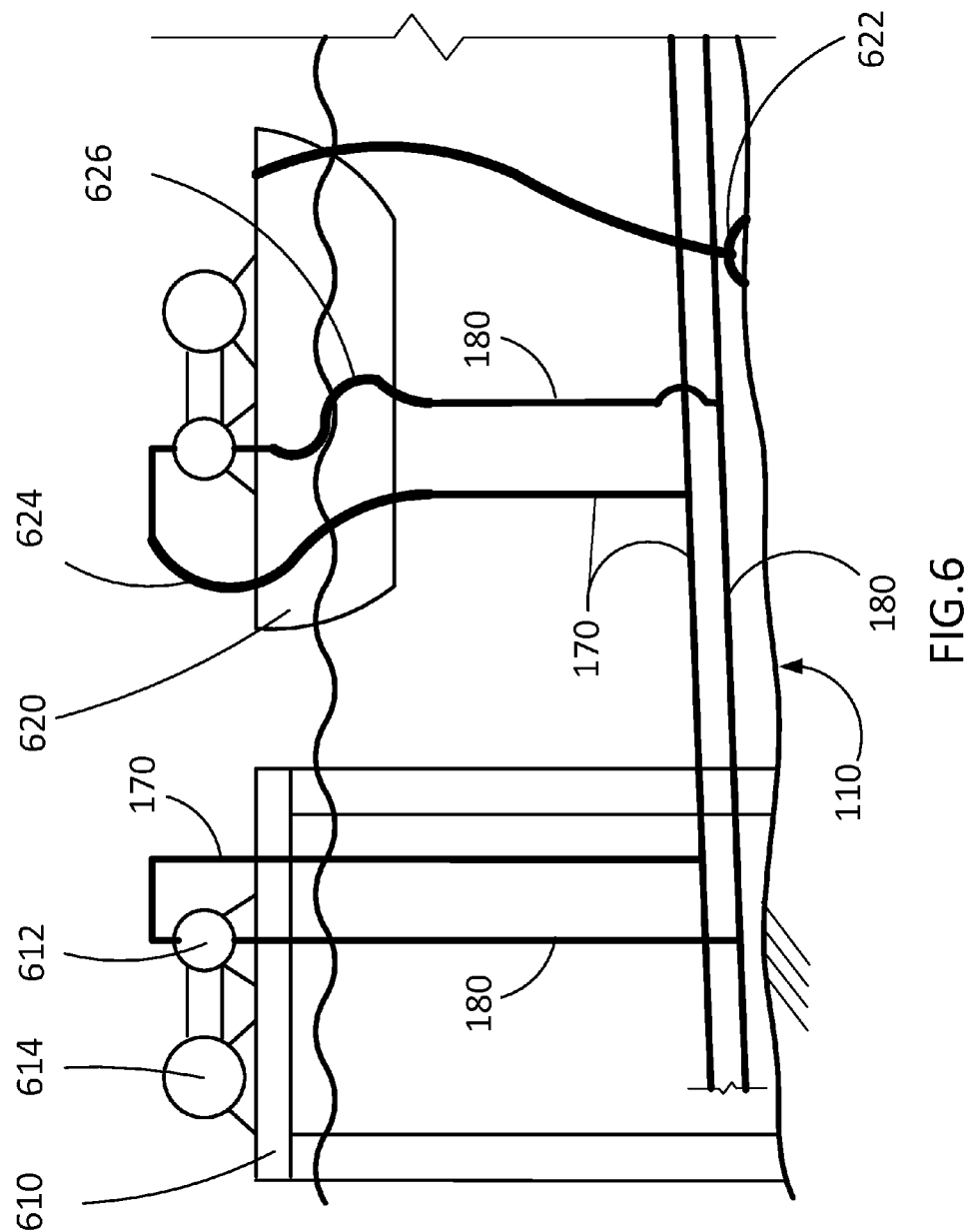
FIG. 6 shows two possible options for generating electrical power using hydraulic power generated by the wave energy converter.

FIG. 6 shows two possible options for generating electrical power using high-pressure hydraulic fluid generated within each hydraulic cylinder, e.g. upstream hydraulic cylinder (160) and second hydraulic cylinder (360).

The first such option uses a seabed-mounted platform (610) where hydraulic motors (612) and electrical generators (614) are located above sea level. Alternatively the platform may be a floating platform.

The second such option uses a ship (620) with an anchor (622). A high-pressure connecting hose (624) supplies high-pressure hydraulic fluid to hydraulic motors (612) and low-pressure connecting hose (626) returns hydraulic fluid to low-pressure manifold (180). The other necessary components well-known to industry, such as gear boxes, transformers, and controllers are not shown for simplicity.

There are many known uses of high-pressure hydraulic fluid and all are potentially available to productively utilize the high-pressure hydraulic fluid produced by the embodiments of the wave energy converter disclosed herein.

The high-pressure hydraulic fluid produced by the wave energy converter may be used for any productive purpose for extracting work from high-pressure hydraulic fluid. Just a few limited examples include electricity production, production of potable water from seawater through reverse osmosis, powering mechanical equipment or powering a flywheel, i.e., a kinetic energy storage device.

Figure 7:
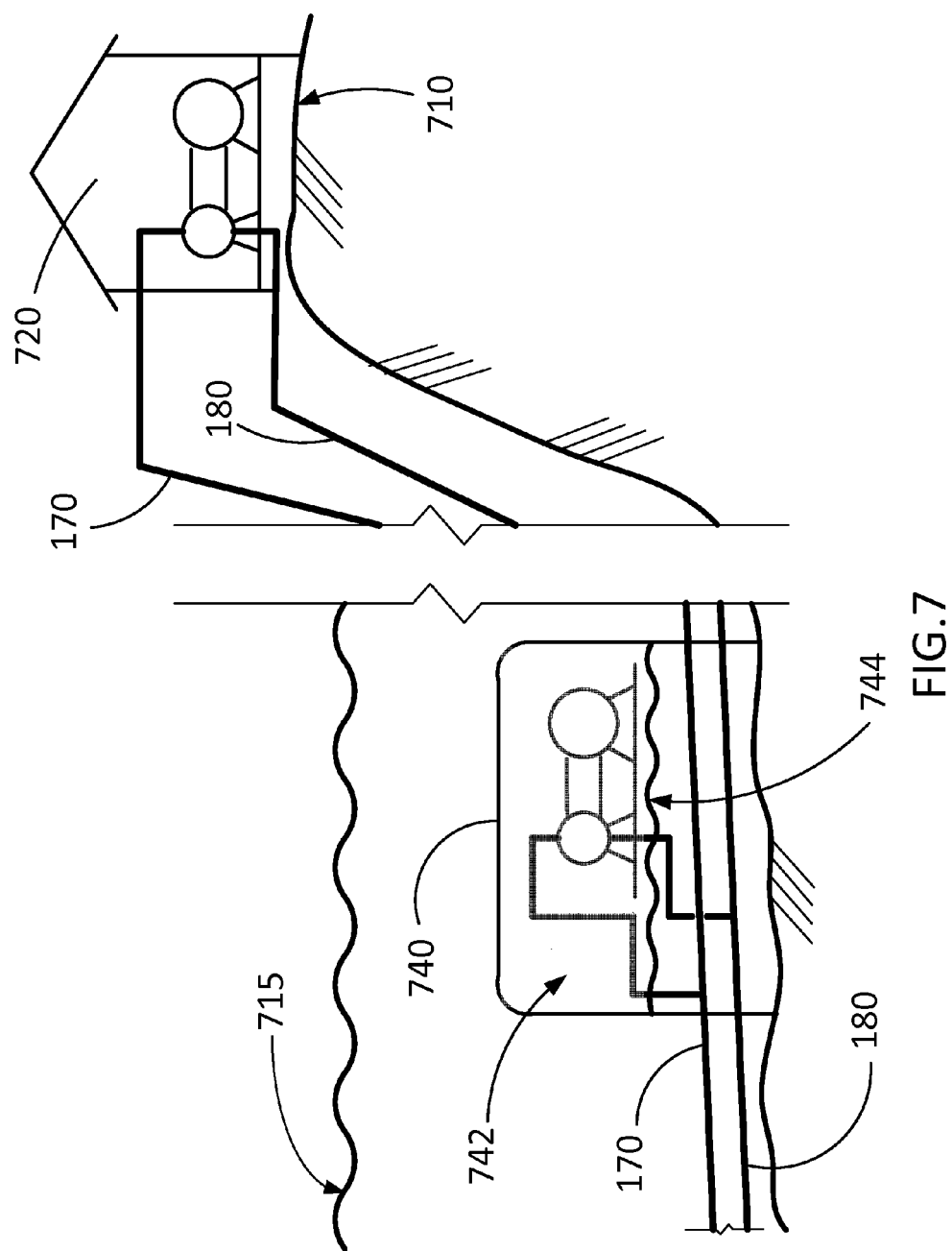
FIG. 7 shows two additional possible options for generating electrical power using hydraulic power generated by the wave energy converter.

FIG. 7 shows two additional options for electrical power generation. The third option uses an onshore facility (720) located on ground (710). The final and fourth option uses an underwater enclosure (740) that is partially filled with air or preferably nitrogen in the upper portion (742) of underwater enclosure (740). Interior water level (744) ensures a dry atmosphere for the power generating equipment located inside underwater enclosure (740).

Example of Electricity Generation

In this example, a hundred wave energy converters are connected together to generate electricity. Each of the hundred wave energy converters is attached to the high-pressure manifold (170) and the low-pressure manifold (180) thereby enabling a significant volume of high pressure hydraulic fluid for generating electrical power at one facility.

In this example, hydraulic fluid used in each upstream hydraulic cylinder (160) and each second hydraulic cylinder (360) is a conventional fluid, such as oil but may also be fresh water, operated in a close-loop manner, to minimize corrosion of the piping and other equipment involved.

In an alternative example, it is feasible to eliminate the low-pressure manifold (180) altogether and use seawater in a once-through arrangement. For such a design, seawater intake must be properly conditioned (not shown) to minimize debris and marine organisms from reaching the most sensitive components, such as the upstream hydraulic cylinder (160), the second hydraulic cylinder (360) and the one-way high-pressure valve (174), for example.

A major advantage of the embodiments presented here derives from the fact that the critical equipment involved is placed near the seabed (110) so that they do not experience excessive forces that are usually present at the free surface of the sea. In other words, high forces and high stresses occur only in each upstream hydraulic cylinder (160) and second hydraulic cylinder (360), which are designed for operation 10 under such conditions.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the energy industry.

What is claimed is:

1. A wave energy converter using differential pressure acting on opposing faces of a first piston to extract energy from a wave transiting a body of water on a surface of the body of water, the wave passing above the wave energy converter, the wave comprising a crest and a trough, the wave energy converter comprising:
    a first vessel comprising:
        a top surface;
        an upstream end;
        a downstream end;
        a longitudinal axis oriented substantially horizontally between the upstream end and the downstream end; and
        the first vessel defining an upstream opening and a downstream opening on the top surface of the first vessel along a longitudinal axis, the upstream opening configured to sit below the crest of the wave when the downstream opening sits below the trough of the wave;
    the first piston slidably secured within the first vessel between the upstream opening and the downstream opening, the first piston comprising an upstream face flowably connected to the upstream opening and a downstream face flowably connected to the downstream opening, the first piston configured to slide within the first vessel parallel to the longitudinal axis in reaction to differential water pressure acting between the upstream face and the downstream face; and
    an upstream hydraulic cylinder within the first vessel aligned parallel to the longitudinal axis, the upstream hydraulic cylinder mounted to the upstream end of the first vessel and to the upstream face of the first piston via a first shaft, the upstream hydraulic cylinder configured to supply pressurized fluid to a high-pressure manifold when the upstream face of the first piston moves toward the upstream hydraulic cylinder.

2. The wave energy converter of claim 1, wherein the upstream hydraulic cylinder comprises a double-acting system, the upstream hydraulic cylinder further configured to supply pressurized fluid to a high-pressure manifold when the upstream face of the first piston moves away from the upstream hydraulic cylinder.

3. The wave energy converter of claim 1, further comprising a downstream hydraulic cylinder within the first vessel aligned parallel to the longitudinal axis, the downstream hydraulic cylinder mounted to the downstream end of the first vessel and to the downstream face of the first piston via a second shaft, the downstream hydraulic cylinder configured to supply pressurized fluid to a high-pressure manifold when the downstream face of the first piston moves toward the downstream hydraulic cylinder.

4. The wave energy converter of claim 1, further comprising:
    a cover plate for each downstream opening, the cover plate slidably positioned over each such downstream opening;
    a hydraulic actuator connected to each such cover plate, the hydraulic actuator configured to enable slidably positioning the cover plate to alter the distance between the upstream opening and the downstream opening; and
    a position sensor for each such cover plate, the position sensor configured to enable remote adjustment of the position of the cover plate.

5. The wave energy converter of claim 1, further comprising a plurality of first adjustable legs wherein each first adjustable leg is located atop a seabed.

6. The wave energy converter of claim 1, wherein the first piston defines a light-weight cavity between the upstream face and the downstream face to result in a substantially neutrally buoyant first piston.

7. The wave energy converter of claim 1, wherein the first piston defines a light-weight cavity between the upstream face and the downstream face to result in an overall density of the first piston that is slightly denser than water.

8. A wave energy converter using differential pressure acting on opposing faces of a second piston to extract energy from a wave transiting a body of water, the wave passing above the wave energy converter on a surface of the body of water, the wave comprising a first crest and a first trough, the wave energy converter comprising:
- a second vessel configured to be located in the body of water adjacent to a seabed, the second vessel held within a framed structure, the second vessel comprising:
  - a vertical upstream duct comprising an upstream opening and an intermediate opening, the intermediate opening configured to be below the upstream opening;
  - a vertical downstream duct comprising a downstream opening configured to be below the first trough when the upstream opening is below the first crest;
  - a horizontal duct flowably connects the vertical upstream duct to the vertical downstream duct;
  - the vertical upstream duct configured to reside below the first crest when the vertical downstream duct resides below the first trough;
- the second piston slidably secured within the vertical upstream duct between the upstream opening and the intermediate opening, the second piston comprising an upstream face flowably connected to the upstream opening and a downstream face flowably connected to the downstream opening through the intermediate opening, the second piston configured to slide up and down within the vertical upstream duct in reaction to differential water pressure acting between the upstream face and the downstream face; and
- a second hydraulic cylinder fixedly attached to the framed structure and attached to the second piston via a second shaft, the second hydraulic cylinder configured to provide a pressurized fluid to a high-pressure manifold when the upstream face of the second piston moves toward the second hydraulic cylinder.

9. The wave energy converter of claim 8, wherein the second hydraulic cylinder comprises a double-acting system, the second hydraulic cylinder further configured to supply pressurized fluid to the high-pressure manifold when the upstream face of the second piston moves away from the second hydraulic cylinder.

10. The wave energy converter of claim 8, further comprising a swivel door that opens at a low point in the horizontal duct.

11. The wave energy converter of claim 8, further comprising a plurality of second adjustable legs.

12. The wave energy converter of claim 8, further comprising a screen attached to the vertical downstream stream duct so as to filter the downstream opening.

13. The wave energy converter of claim 8, wherein the second piston defines a light-weight cavity between the upstream face and the downstream face to result in a substantially neutrally buoyant second piston.

14. The wave energy converter of claim 8, wherein the second piston defines a light-weight cavity between the upstream face and the downstream face to result in an overall density of the second piston that is slightly less dense than water.

* * * * *